United States Patent
Carson

(10) Patent No.: US 8,300,505 B2
(45) Date of Patent: Oct. 30, 2012

(54) WRITING REPEATING PATTERNS OF FEATURES TO A SUBSTRATE

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 0 days.

(21) Appl. No.: 13/043,291

(22) Filed: Mar. 8, 2011

(65) Prior Publication Data

US 2011/0216433 A1 Sep. 8, 2011

Related U.S. Application Data

(60) Provisional application No. 61/311,597, filed on Mar. 8, 2010.

(51) Int. Cl.
*G11B 7/00* (2006.01)
(52) U.S. Cl. ............... 369/47.49; 369/47.22; 369/59.24; 369/59.25
(58) Field of Classification Search .......... 369/103, 369/47.19, 47.21, 47.22, 47.32, 59.23–59.25, 369/53.31, 47.5, 47.51, 47.53, 47.49, 275.3, 369/275.4; 360/40, 48, 75
See application file for complete search history.

(56) References Cited

U.S. PATENT DOCUMENTS

| | | | |
|---|---|---|---|
| 5,450,383 A | 9/1995 | Call et al. | |
| 5,863,682 A | 1/1999 | Abe et al. | |
| 6,014,200 A | 1/2000 | Sogard et al. | |
| 6,313,476 B1 | 11/2001 | Shimizu et al. | |
| 6,846,618 B2 | 1/2005 | Hsu et al. | |
| 6,972,268 B2 | 12/2005 | Ehrmann et al. | |
| 7,301,870 B2 | 11/2007 | Masui | |
| 7,714,308 B2 | 5/2010 | Hiroshima | |
| 2001/0028620 A1 | 10/2001 | Guerra | |
| 2002/0176695 A1* | 11/2002 | Sawabe et al. | 386/95 |
| 2003/0160034 A1 | 8/2003 | Filgas et al. | |
| 2004/0136308 A1* | 7/2004 | Kuroda | 369/59.25 |
| 2005/0237645 A1 | 10/2005 | Ehrlich | |
| 2005/0237659 A1 | 10/2005 | Ehrlich | |
| 2006/0119977 A1 | 6/2006 | Zhu et al. | |
| 2006/0126477 A1 | 6/2006 | Livingston et al. | |
| 2006/0206851 A1 | 9/2006 | Van Wingerden et al. | |
| 2007/0177433 A1* | 8/2007 | Poirier | 365/189.05 |
| 2010/0015537 A1 | 1/2010 | Emi et al. | |
| 2011/0307459 A1* | 12/2011 | Jacob (Yaakov) | 707/705 |

\* cited by examiner

*Primary Examiner* — Thang Tran
(74) *Attorney, Agent, or Firm* — Hall Estill Attorneys at Law

(57) ABSTRACT

Method and apparatus for writing repeating patterns of features to a substrate, such as a data storage medium. In accordance with some embodiments, a multi-dimensional pattern of discrete features of different sizes to be written to a substrate is divided into a plurality of contiguous regions. A unique set of compensation values is assigned to each region. A write beam of a write system is used to write the features to the substrate responsive to said unique sets of compensation values so that all of the features having a common size in at least one region are written using the same compensation values from the associated set.

18 Claims, 8 Drawing Sheets

WRITING REPEATING PATTERNS OF FEATURES TO A SUBSTRATE

RELATED APPLICATIONS

The present application makes a claim of domestic priority to U.S. Provisional Patent Application No. 61/311,597 filed Mar. 8, 2010, which is hereby incorporated by reference.

BACKGROUND

Data storage media are used to store and retrieve large amounts of digitally encoded data in a fast and efficient manner. Such media have been commercially provided in a number of different forms, such as magnetic, optical and solid-state (e.g., flash memory, etc.).

So-called patterned media can be generated by writing a two dimensional (2D) array of discrete features to a substrate, such as a recordable disc or semiconductor device. The writing process can utilize a write beam, such as a particle beam from an electron beam recorder (EBR), to impinge localized areas on the substrate to form a desired pattern of features. The substrate can be subjected to subsequent processing, such as a lithography operation, to produce a number of replicated media with the written pattern.

These and other types of writing processes can provide what is sometimes referred to as a proximity effect, which generally describes a phenomenon whereby adjacent areas surrounding the focal point of a beam are undesirably affected by the beam. For example, an EBR beam can provide some measure of back scattered electrons in an influence area surrounding the beam. These back scattered electrons can alter previously written features, such as by blurring or fogging of the transition boundaries of the features. Other types of write beams can also have corresponding influence areas, such as laser beams, magnetic recording beams, etc.

SUMMARY

Various embodiments of the present invention are generally directed to a method and apparatus for writing repeating patterns of features to a substrate, such as but not limited to a rotatable data storage disc.

In accordance with some embodiments, a multi-dimensional pattern of discrete features of different sizes to be written to a substrate is divided into a plurality of contiguous regions. A unique set of compensation values is assigned to each region. A write beam of a write system is used to write the features to the substrate responsive to said unique sets of compensation values so that all of the features having a common size in at least one region are written using the same compensation values from the associated set.

These and various other features and advantages of various embodiments can be understood from the following detailed description and a review of the associated drawings.

DETAILED DESCRIPTION

Various embodiments of the present invention are generally directed to forming a pattern on a substrate, such as but not limited to a rotatable storage medium. The pattern may constitute a two dimensional (2D) array of discrete features. Compensation for proximity effects during such writing can be provided as explained below.

Figure 1:
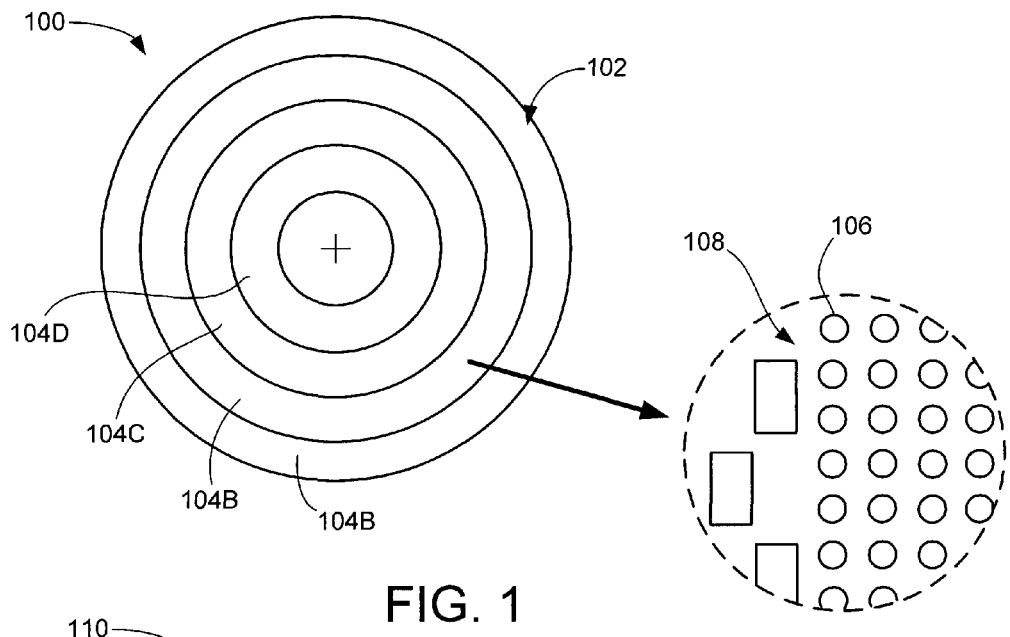
FIG. 1 shows a data storage medium formatted in accordance with various embodiments of the present invention.

FIG. 1 represents a rotatable data storage medium 100 configured in accordance with various embodiments of the present invention. For purposes of the present discussion, the medium 100 will be characterized as a magnetic data storage disc for use in a hard disc drive (HDD) data storage device. The medium can take other forms, however, such as an optical disc, a magneto-optical disc, etc. It will be noted that the techniques presented herein are not limited to rotatable media, but can be readily extended to any number of other forms of substrates such as solid-state semiconductor layers, etc.

The medium 100 (disc) stores data along circumferentially extending tracks that are defined on a disc recording surface 102. A second disc recording surface can be provided on the underside of the disc 100 as desired. The disc 100 employs zone-based recording (ZBR) as represented by concentrically arranged zones 104A-104D defined on the recording surface 102. Each zone includes a plurality of concentric tracks. The tracks in each zone have the same number of channel bits recorded thereto. As each zone has a constant recording density, a different recovery clock frequency can be used to recover the data stored in each zone.

It is contemplated that the disc 100 constitutes patterned media in which an array of localized recordable features are defined on the disc, such as represented at 106. The features 106 can take any number of forms, arrangements and shapes depending on the requirements of a given application. The white space between the features 106 represents non-recordable buffer areas 108 that surround the recordable feature areas. The features 106 in FIG. 1 are configured to store discrete, localized magnetic domains that can be sensed by a readback transducer (head) to recover data from the disc 100.

Figure 2:
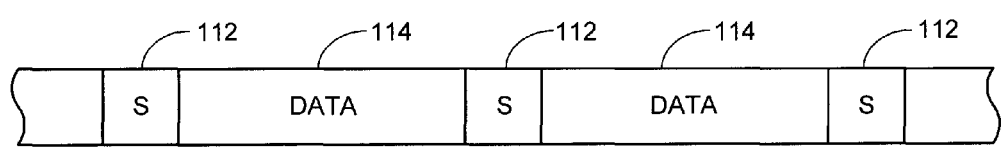
FIG. 2 provides an exemplary format for a data track of the storage medium.

FIG. 2 shows an exemplary configuration for a track 110 from the recording surface 102 of FIG. 1. It will be appreciated that other configurations can readily be used. In some embodiments, servo fields 112 are embedded in spaced-apart relation with user data fields 114. The servo fields 112 store servo information used to control read transducer positioning, and the data fields 114 store user data in the form of addressable sectors.

Figure 3:
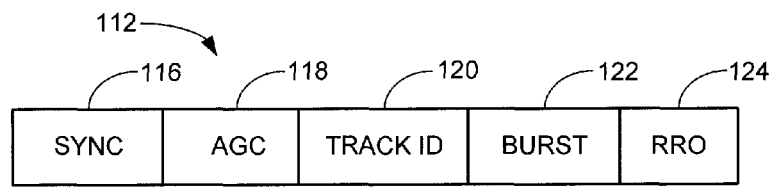
FIG. 3 is an exemplary format for a servo field.

FIG. 3 illustrates different types of servo data that may be incorporated into the servo fields 112. A synchronization (sync) field 116 stores a specially configured bit pattern to signal the beginning of a servo field 112. An automatic gain control (AGC) field 118 provides an oscillating (e.g., repetitive 2T) pattern to enable the servo circuit to obtain frequency lock on the servo data. An address field 120 stores a multi-bit track address code (such as Gray code). A burst field 122 provides radially offset burst patterns (such as A, B, C, D dibit patterns) to facilitate intra-track positioning, and a repeated runout (RRO) field 124 allows storage of RRO compensation values.

Figure 4:
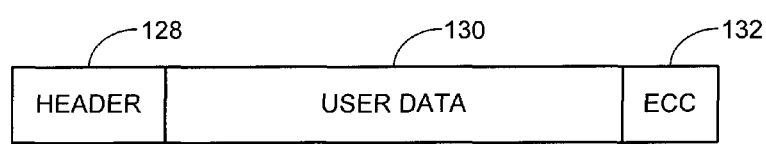
FIG. 4 is an exemplary format for a data sector.

FIG. 4 illustrates an exemplary configuration for a data sector 126 in the user data field portions 114 of the track 110. In accordance with the exemplary ZBR scheme employed by the disc 100, all of the tracks 110 in a selected zone 104A-104D will store the same number of user data sectors, and the number of sectors/track will be different for each zone. The outermost zone 104A will store the greatest number of sectors/track and the innermost zone 104D will store the fewest number of sectors/track. It is contemplated that each track 100 may store up to several hundred data sectors 126.

The data sector 126 may include a header field 128 to store address information, an AGC pattern, or other types of overhead data. A user data field 130 stores a selected amount of user data, such as 512 bytes. An error correction code (ECC) field 132 stores ECC codes to allow up to a selected number of errors in the user data to be detected and corrected by the readback circuit.

Figure 5:
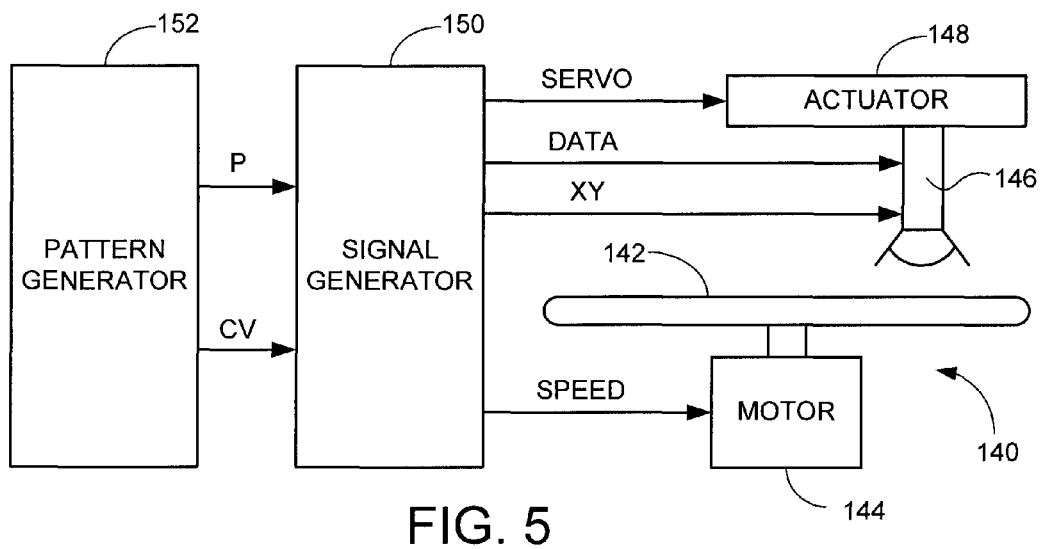
FIG. 5 sets forth a functional block diagram for a writing system used to write patterns to a storage medium in accordance with various embodiments.

FIG. 5 represents a write system 140 that can be used to format a disc such as 100. For purposes of the present discussion the write system 140 will be characterized as an electron beam recorder (EBR), although other forms of write system can be used such as but not limited to a servo track writer (STW), a laser beam recorder (LBR), etc. The write system rotates a medium 142 using a motor 144. The medium 142 may constitute a master disc from which a population of nominally identical discs 100 are formed in a replication process. A write beam assembly 146 provides a beam, such as a controlled stream of electrons or other particles, onto the medium 142 to impart the desired pattern of localized features. The write beam is controllably positioned by an actuator 148.

A signal generator block 150 supplies a number of control signals to write the features to the medium 142. These signals are shown to include data modulation signals, one or more servo position control signals, XY beam deflection signals, and motor speed control signals. The signal generator block 150 may generate these signals responsive to pattern signals P and compensation values CV provided by a pattern generator block 152. The blocks 150, 152 may form a portion of a programmable controller with associated programming steps stored in memory, or may be realized in hardware.

Figure 6:
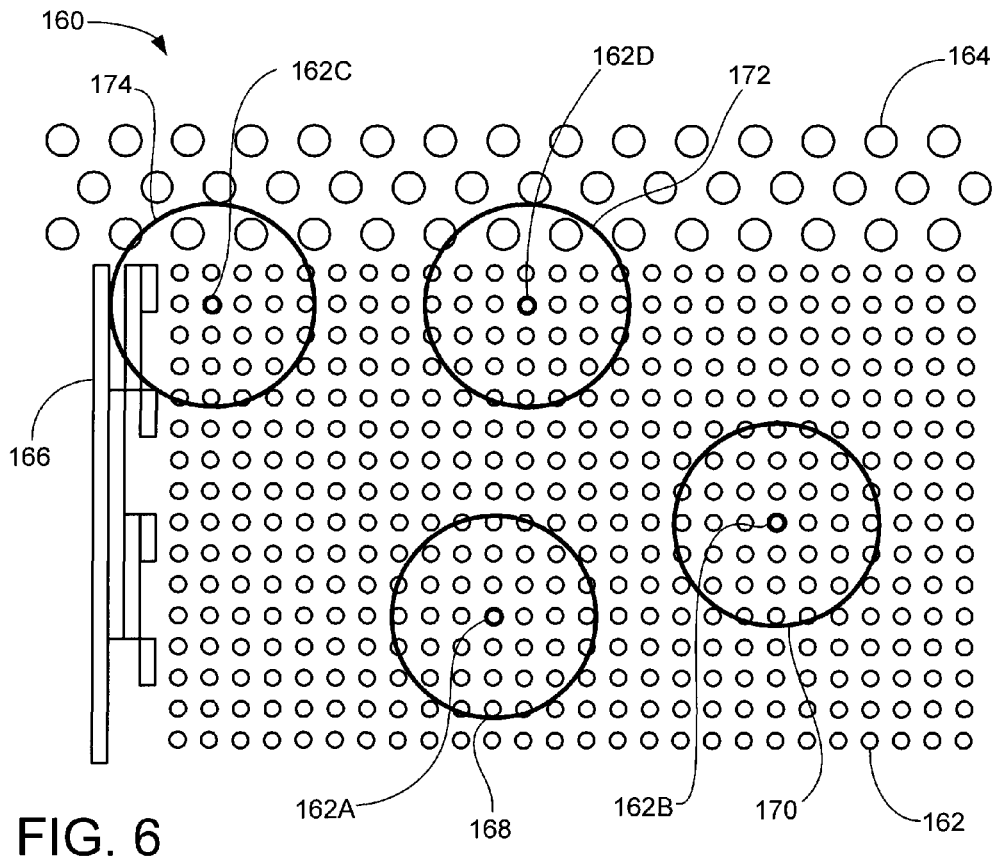
FIG. 6 shows a first exemplary pattern of features in a two dimensional (2D) array.

FIG. 6 shows a portion of an exemplary pattern 160 written by the system 140 of FIG. 5. The pattern includes a number of different types of features, including relatively small round features 162, relatively larger round features 164, and rectangular features 166. These features can correspond to the various types of data described in FIGS. 2-4. Other feature shapes and sizes can also be generated as desired.

Generally, greater data storage density can be achieved through the use of smaller feature sizes and smaller distances between adjacent features. As patterns become more densely packed with features, however, the recording signal used to generate the features may undesirably interfere or influence the written characteristics of other nearby features. For example, it is known that during EBR recording, a phenomenon referred to as the proximity effect can give rise to blurring or fogging effects by back-scattered particles in the area surrounding the focal point of the beam. A previously written feature may thus be altered by the subsequent writing of an adjacent feature. Other adjacent feature influences can arise using other types of recording, such as laser scatter during laser recording and adjacent track interference during magnetic recording.

FIG. 6 shows a number of respective circles referred to as influence areas. Each influence area has a radius nominally equal to the distance occupied by three adjacent small features 162 (including the space therebetween). While the exemplary influence areas are circular in shape, the actual influence areas may be any shape including rectangular, square, oblong etc. Influence is generally inversely proportional to distance, so that it will be understood that the influence area boundaries shown in FIG. 6 can represent a threshold between effective levels of influence that occur within each area, and negligible levels of influence for regions beyond each area.

A first influence area is denoted at 168 for a selected small feature 162A. This means that the writing of feature 162A will generally influence the other small features within the area 168. These influences may require adjustments to the various signals generated by the system 140, including adjustments in recording power, pulse timing, beam deflection, etc. The type and amount of adjustment for each individual feature will depend on the distance, location, size and actual recording characteristics of all other features inside the respective area of influence.

A second influence area is denoted at 170 for a second selected small feature 162B. The influence area 170 also encompasses the same type and arrangement of small features as contained within influence area 168. Thus, the same adjustments applied within area 168 can be applied to the features encompassed within area 170.

A third influence area is denoted at 172 for a third selected small feature 162C. Unlike the influence areas 168 and 170, the area 172 encompasses some of the larger features 164. Recording within area 172 will have different recording characteristics due to the fact that the area of influence covers both smaller and larger features. A fourth influence area is denoted at 174 for a fourth selected small feature 162D. The area 174 encompasses both larger features 164 and rectangular features 166. This will provide yet a different set of influences due to the various feature types encompassed therein.

A number of approaches have been proposed in the art to provide proximity effect compensation for features such as illustrated in FIG. 6. One conventional method generally involves calculating compensation values for each feature in the array, and transmitting these compensation values along with the pattern data to a signal generator such as 150 (FIG. 5) to generate the appropriate output values to write the features to the substrate.

Figure 7A:
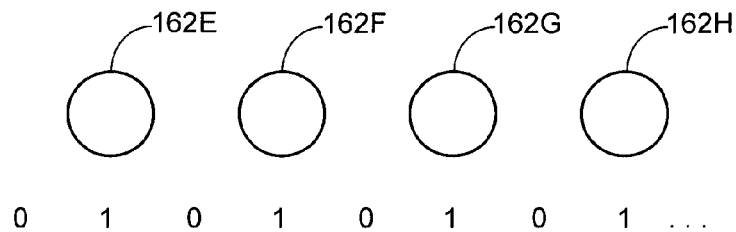
FIG. 7A shows a simplified pattern of repeating patterns.

While operable, a limitation with this approach is the large number of computations required to generate compensation values for all pattern features, as well as the large amounts of data that need to be transmitted to effect the feature compensation. For example, FIG. 7A shows a simple pattern of four small features from FIG. 6 denoted as 162E-H. This simple pattern could be written using the input modulation sequence 01010101 at a fixed clock rate. This would generally only require eight (8) bits of data, one bit for each feature, with a "0" meaning no recording power, and a "1" meaning full recording power.

Once compensation values are included in the write effort, however, the amount of data required to write this simple pattern in FIG. 7A may increase at a substantially geometric rate. It will be noted that such compensation values may result from the influence areas of adjacent bits discussed in FIG. 6, but this is merely exemplary and not limiting; as used herein, compensation values are data values that result in system adjustments, for whatever reason, that are carried out in order to obtain the finally desired pattern on the substrate. Thus the compensation may be applied due to the influence of adjacent features, or for other factors.

Figure 7B:
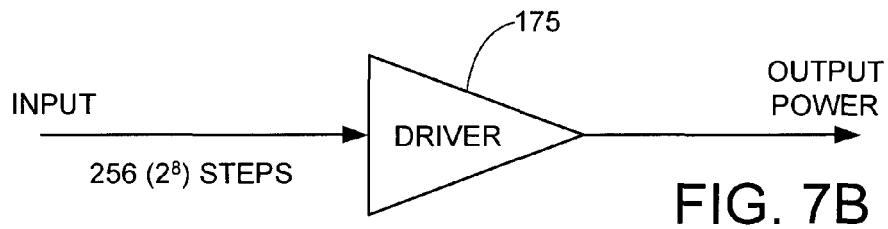
FIG. 7B illustrates how different power levels may be used to write the pattern of FIG. 7A

One area in which such compensation values can be applied relates to adjustments in the amount of recording power that is applied by the write source. FIG. 7B illustrates an exemplary write driver 175 configured to receive a digital input over a selected range, such as over 256 ($2^8$) steps, to output different magnitudes of applied write source power. The driver circuit in FIG. 7B thus requires an additional eight bits to set the appropriate power level for each feature in FIG. 7A.

Figure 7C:
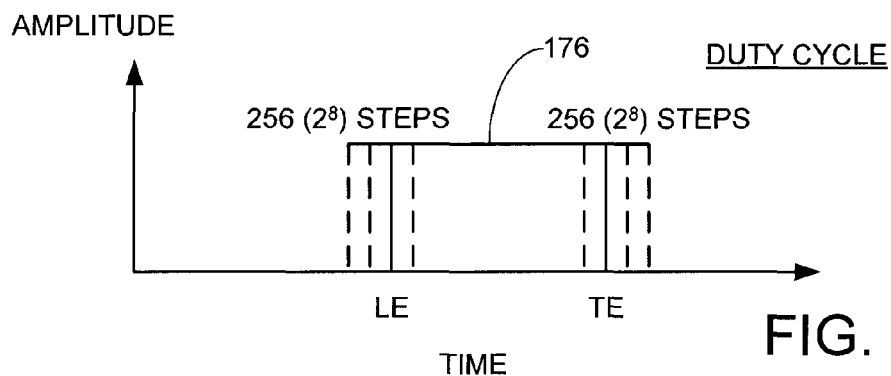
FIG. 7C shows the use of different duty cycles to write the pattern of FIG. 7A.
Figure 7D:
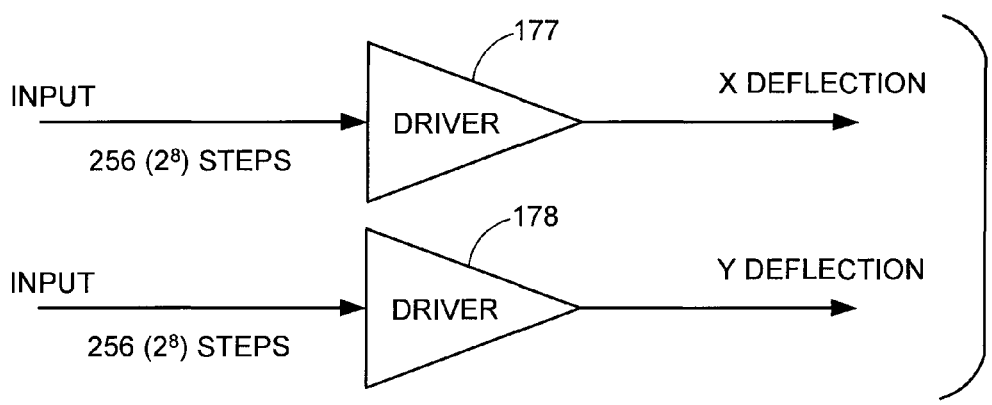
FIG. 7D provides X and Y dimension deflection compensation values that can be used to write the pattern of FIG. 7A.

Similarly, as shown by FIG. 7C, adjustments to the duty cycle of each write pulse 176 may require edge adjustments of $\frac{1}{256}$ steps for both the leading edge (LE) and the trailing edge (TE) of the pulse. This will require a further eight bits for each edge. Other possible adjustments include radial (X) and/or angular (Y) deflection of the write beam, as shown in FIG. 7D for beam deflection drivers 176, 178. It will be appreciated that these parametric adjustments are merely exemplary and are not limiting, as any number of other types of adjustments might be suitable depending on the requirements of a given application, such as but not limited to changes in write frequency, focus, fly height, heater power, and so on. Moreover, while 8-bit resolution has been provided for purposes of illustration, other resolution levels greater or lesser than this (e.g. 6-bit, 24-bit, etc.) can be used as desired.

It follows that writing even a simple pattern such as in FIG. 7A can require a significant amount of system configuration data for each individual feature. In some real world applications, it has been found that the writing of N features may require some scalar multiple of bits, such as 32*N bits or more, to provide the requisite compensation. More generally, some scalar multiplier X may be required (X*N data bits to write N features, with X being a relatively large number). For patterns involving millions of features, such as is typical for a single data track on an HDD, this represents a significant amount of overall control data (e.g., several gigabits of data or more).

Accordingly, various embodiments of the present invention are generally directed to providing an encoded data set for an array of features written to a substrate that reduces both calculation complexity and data transmission requirements.

As explained below, a multi-dimensional array of features can be analyzed along multiple axial directions to identify different types of contiguous regions in which uniform compensation values can be applied to all of the features within each region. A unique set of compensation values can be assigned to provide compensation for the features in each of these regions.

Thereafter, during the writing of the features to the substrate, the compensation values for a given region can be transmitted once to a pattern generator (e.g., a signal generator), and repetitively applied by the pattern generator to each feature within the region.

As desired, at least some of the regions are sub-divided into sub-regions, and different compensation values are provided for each of the sub-regions. This can be useful, for example, with buffer regions between two different types (e.g., sizes) of features.

In accordance with further embodiments, secondary regions within the array can be identified that have the same kinds of feature sizes and arrangements as in one of the primary regions. The compensation values for the associated primary regions are applied to each of the features in the corresponding secondary regions. In this way, only one set of compensation values need be generated for each type of region, and that set of compensation value only needs to be transmitted once and can be reused for each of the corresponding secondary regions.

Further data computation and data transmission efficiencies can be realized by analyzing the sequence of patterns along a single recording direction, such as along each track for the exemplary storage disc 100 of FIG. 1. A distinction can be made between repeating patterns of features that can be grouped together to share the associated compensation values, and non-repeating patterns of features that require a different set of compensation values.

It will be appreciated that features written in accordance with various embodiments may be written over a number of passes, so that portions of the final feature are written during each pass and these portions are "stitched" together to form the final feature. In such case, the same compensation values can be used for each pass. Alternatively, a different set of compensation values can be defined for each pass, but the same compensation values are nevertheless applied to all of the features in the associated region during each respective pass.

Figure 8:
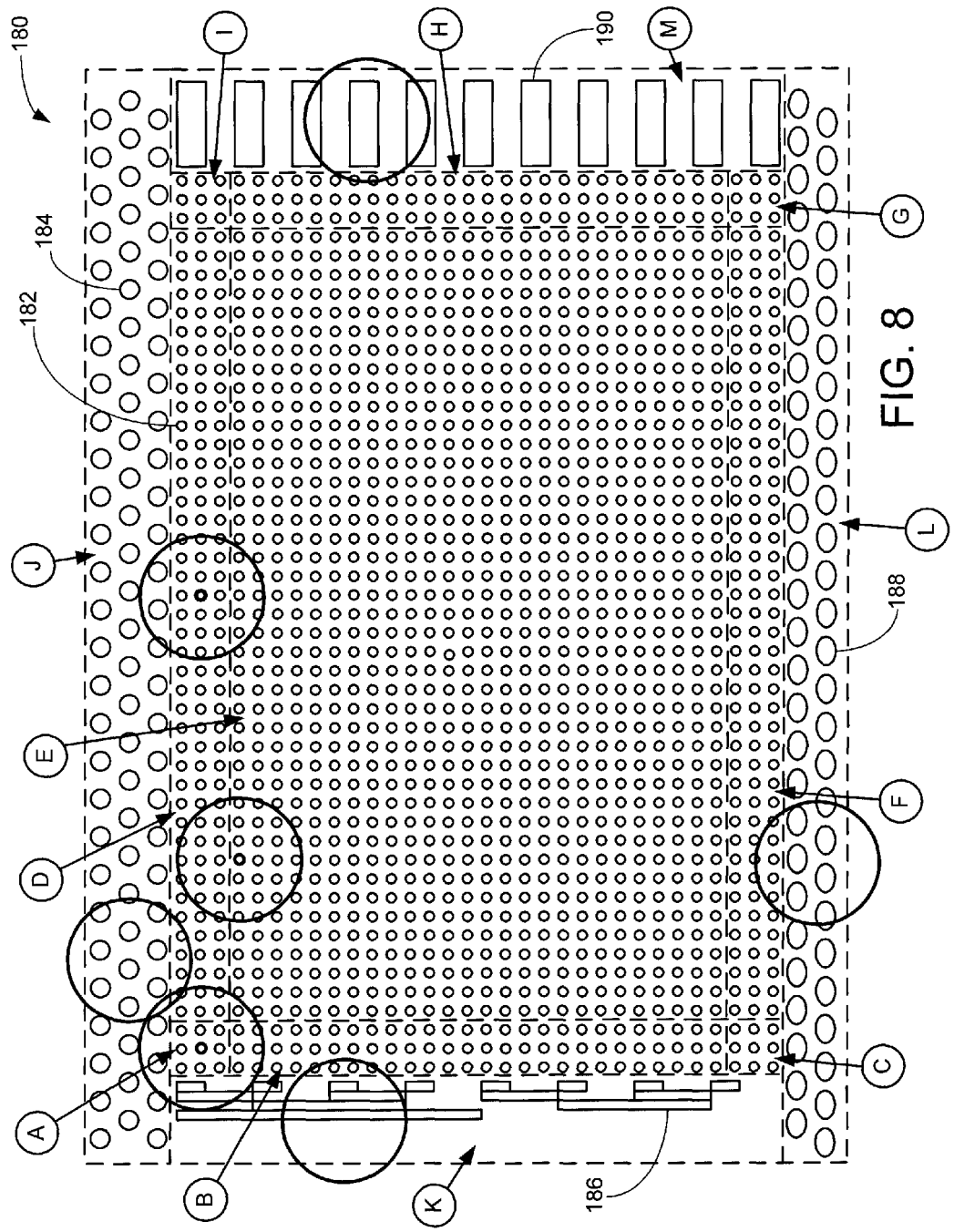
FIG. 8 shows a second exemplary pattern of features in a 2D array.

These and other aspects of various embodiments presented herein can be understood with a review of FIG. 8, which provides an exemplary pattern 180 that can be formed by the system 140 of FIG. 5 upon the master disc 142 shown therein. The pattern 180 includes a first array of relatively small round (user data) features 182, a second array of relatively large round (guard band) features 184, a third array of radially extending (track ID) rectangular features 186, a fourth array of elliptical (guard band) features 188, and a fifth array of angularly extending (servo burst) rectangular features 190. As before, any number of different types and arrangements of features can be used, so the pattern 180 shown in FIG. 8 is merely illustrative and is not limiting.

The first array can be characterized as a 48×32 array of the small round features 182 arranged in a regularly occurring pattern along both horizontal (angular) and vertical (radial) directions. The second array has 28×3 of the large round features 184 in a regular horizontal arrangement, with each row offset by ½ the horizontal distance from the previous row. The third array has 4×32 of the rectangular features 186 arranged in a recurring stepwise (bit incrementing) fashion. The fourth array contains 28×2 of the elliptical features 188 in a regular arrangement with each row offset by ½ the horizontal distance from the previous row. The fifth array has 1×11 of the large rectangular features 190 arranged along a single vertical column.

As discussed above, in the present example the influence distance will be contemplated as being equivalent to the radial distance corresponding to three adjacent small features 182. Assuming that influence compensation will be provided for four (4) adjustable parameters (power, leading edge timing, trailing edge timing and radial position), eight (8) bits can be used to describe each parameter, and individual compensation values can be individually calculated and transmitted for each feature, the total amount of data may be expressed as [(48×32)+(28×3)+(4×32)+(28×2)+(1×11)]×32=58,080 bits for all 1815 features in FIG. 7 using conventional processing.

In accordance with various embodiments, instead of calculating and transmitting this much data, the pattern 180 is analyzed to identify different contiguous regions for which a common type of compensation can be applied to each of the features in that region. FIG. 8 shows a total of 13 exemplary regions A through M defined therein. Influence areas for some of these regions are included to help show how the various region boundaries may be selected. It will be appreciated that the size of the influence area will help determine the appropriate region boundaries.

Because there are a total of 13 regions, each region can be uniquely identified using 4 bits (e.g., 0000 to identify region A, 0001 to identify region B, up to 1100 to identify region M).

With reference to region E, this region constitutes an array of 26×42=1092 small round features 182. The recording parameters used to record each of these features can be described by 32 bits (4 parameters×8 bits/parameter). Four (4) additional bits (region code) can be used to identify the region as region E. Thus, the total number of bits required to record the features in region E will be 32 bits for the compensation parameters, plus each of the 1092 base recording features specified by its associated region code (1092×4=4368) for a total of 4400 bits. This is significantly less than the 34,944 bits that would be required to individually describe each feature in this portion of the array (1092×32=34,944).

A further reduction in the required number of bits can be to describe the region E array size of 26 rows by 42 columns (26×42) as two eight (8) bit values, one 8 bit value providing the row location (horizontal placement) and the other 8 bit value providing the column location (vertical placement). In this alternative scheme, the total number of bits would be 32 bits for the recording parameters, plus 8 bits for the feature row position, 8 bits for the feature column position and 4 bits for the region for a total of 52 bits (32+8+8+4=52).

Region D would require a total of 4032 bits to describe the compensation parameters using conventional individual addressing (3 rows×42 columns×32 bits=4032 bits). By contrast, applying uniform compensation to the features in region D in accordance with the present disclosure would provide alternative solutions of 560 bits ((4×132)+32=560) or 46 bits (32+2+8+4=46), depending on how the data are formatted.

In some situations it may be desirable to define sub-regions within a given region to account for different types of features on opposing sides of the region. For example, region D is disposed between regions E and J, and has a width that corresponds to the influence area radius of three (3) small features. Region D thus serves as a buffer between regions E and J in that, for practical purposes, the writing of the large features 184 to region E will not affect the small features 182 in region J, and vice versa.

However, closer examination of region D shows that all of the features in the lowest row will be mainly influenced by region E with only a small amount of influence from region J, whereas the features in the topmost row will be mainly influenced by region J with less influence coming from region E. Due to increasing influence by the larger features 184 in region J on a row-by-row basis, it may be desirable to divide region D into three sub-regions, one for each row. Three sets of compensation values can thus be provided for region D, with a different set of the compensation values being applied to all of the features along a given row. Sub-regions can be defined for other regions that serve as buffer zones between different types of features, such as regions B, F and H.

Once the various unique sets of compensation values have been assigned to the various regions (and sub-regions as required), repeating occurrences of the regions can be identified and the compensation values reused without the need to re-transmit the compensation values. The respective amounts of pattern data and the associated sets of compensation values (CV) that are transmitted to the pattern generator (150, FIG. 5) can thus be significantly reduced.

Figure 9:
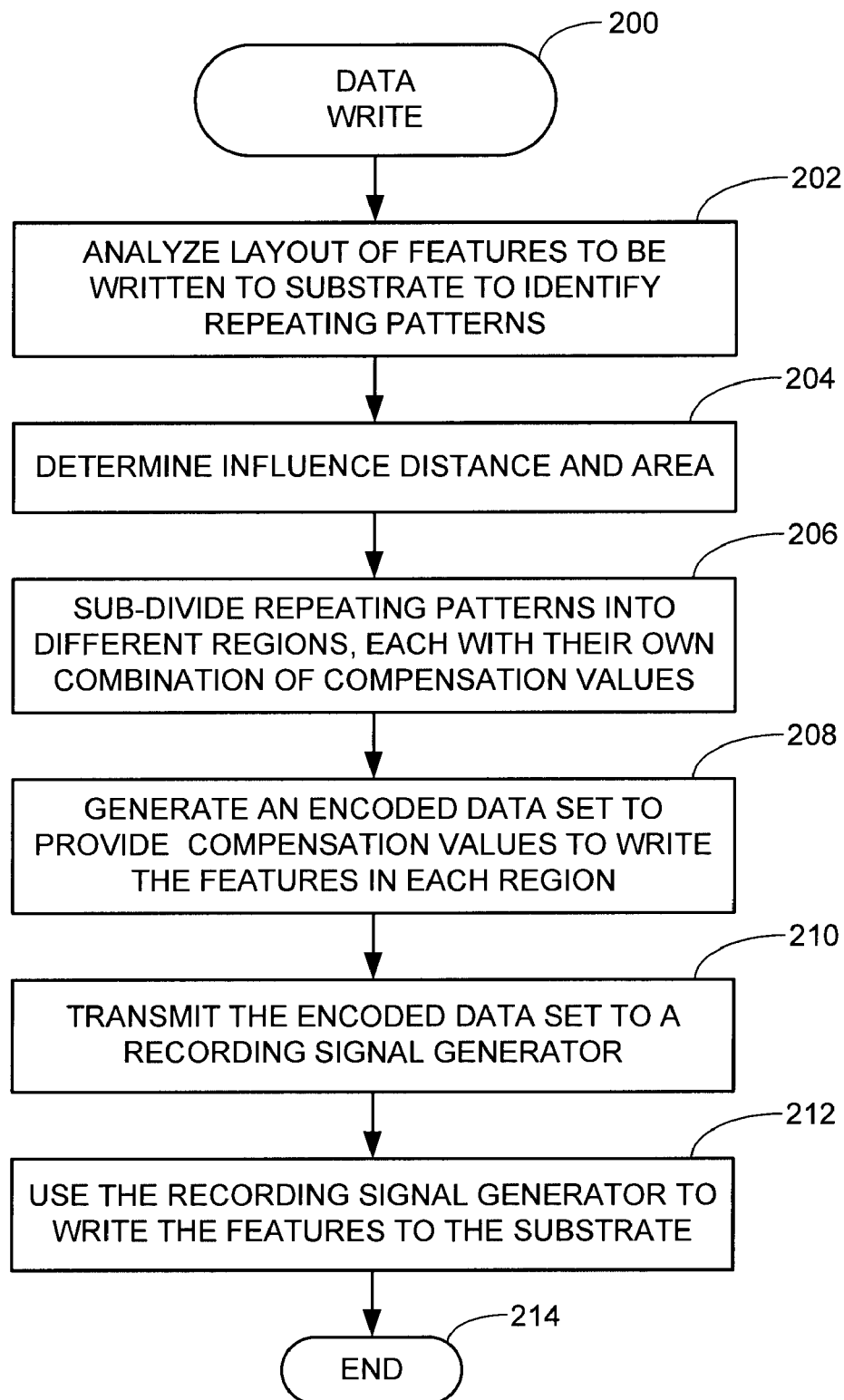
FIG. 9 provides a flow chart for a DATA WRITE routine useful in writing the pattern of features in FIG. 8.

FIG. 9 provides a flow chart for a DATA WRITE routine 200, generally illustrative of the foregoing discussion. The routine generally involves analyzing a layout of two dimensional physical patterns to be recorded to a substrate. The patterns are divided into regions, or areas, to which respective compensation values can be applied to each of the features in each said region. As desired, buffer regions (such as D in FIG. 8) can be further subdivided into sub-regions based on relative proximity to the adjacent regions.

After the sub-regions have been identified, repeated recording features which will have identical recording parameters can be described by one set of recording parameters and a representation of the x and y location and size of the array of features to be recorded. In some cases, these features with identical recording parameters will exist in a two dimensional arrays, in other cases these features may exist in a one dimensional array. In either case, efficiency is gained by only describing the recording parameters one time for a sequence of recording features.

The exemplary routine 200 can be characterized by the following steps. First, as shown by step 202, a layout of features to be recorded to a substrate is analyzed with a view toward identifying areas of repeating patterns at the physical recording level in either the horizontal or vertical dimension (or both).

Next, the influence distance and associated multi-dimensional influence area is determined, step 204. As discussed above, the influence area may be characterized as the overall area such that any feature recorded inside the influence area will influence any other features recorded in the influence area. It will be recalled that the exemplary influence area in FIG. 8 has a radius nominally equal to the distance occupied by three adjacent features 162 (and the space therebetween), although any suitable metric or distance can be selected based on the requirements of a given application. While circular influence areas have been used, such is merely exemplary and not limiting.

Patterns of repeating features within the layout are next sub-divided into different regions at step 206. One category of sub-division may be identified for first regions which will have the same compensation values for all recorded features within those regions. Another category of sub-division may be identified as second regions which are adjacent to other, third regions which have different regular patterns from the second type of regions. Yet another category of sub-division may be identified as fourth regions which have irregular patterns or which are adjacent to regions of irregular or no repeating patterns. Other forms and descriptions can be made as desired. It may turn out that some regions of the substrate may require a discrete description of the compensation values for each recorded feature therein.

The routine continues at step 208 in which the recorded feature in each region (and, as required, sub-region) defined in step 206 is described in a non-discrete manner. For example, a selected region may be described as a set of recording parameters used for each feature therein, followed by a repeat count in the horizontal and/or vertical dimensions to identify a total number of features to be written using that set of recording parameters. An encoded data set can be generated that describes all of the features in each of the defined regions.

At step 210, the encoded data set is transmitted to a recording signal generator, such as the signal generator 150 in FIG. 5. At step 212, the generator proceeds to use the transmitted data set to output the appropriate compensation values (see e.g., FIGS. 7A-7D) to write the layout of features to a substrate, after which the routine ends at step 214.

In accordance with related embodiments, additional steps may be taken as desired to further decrease the amount of computations and transmitted data required to write a given layout of features to a substrate. These related embodiments may be combined with the previous approach set forth by the routine 200 of FIG. 9, or may be carried out separately. While these related embodiments can readily provide influence area compensation, such is not necessarily required.

Figure 10:
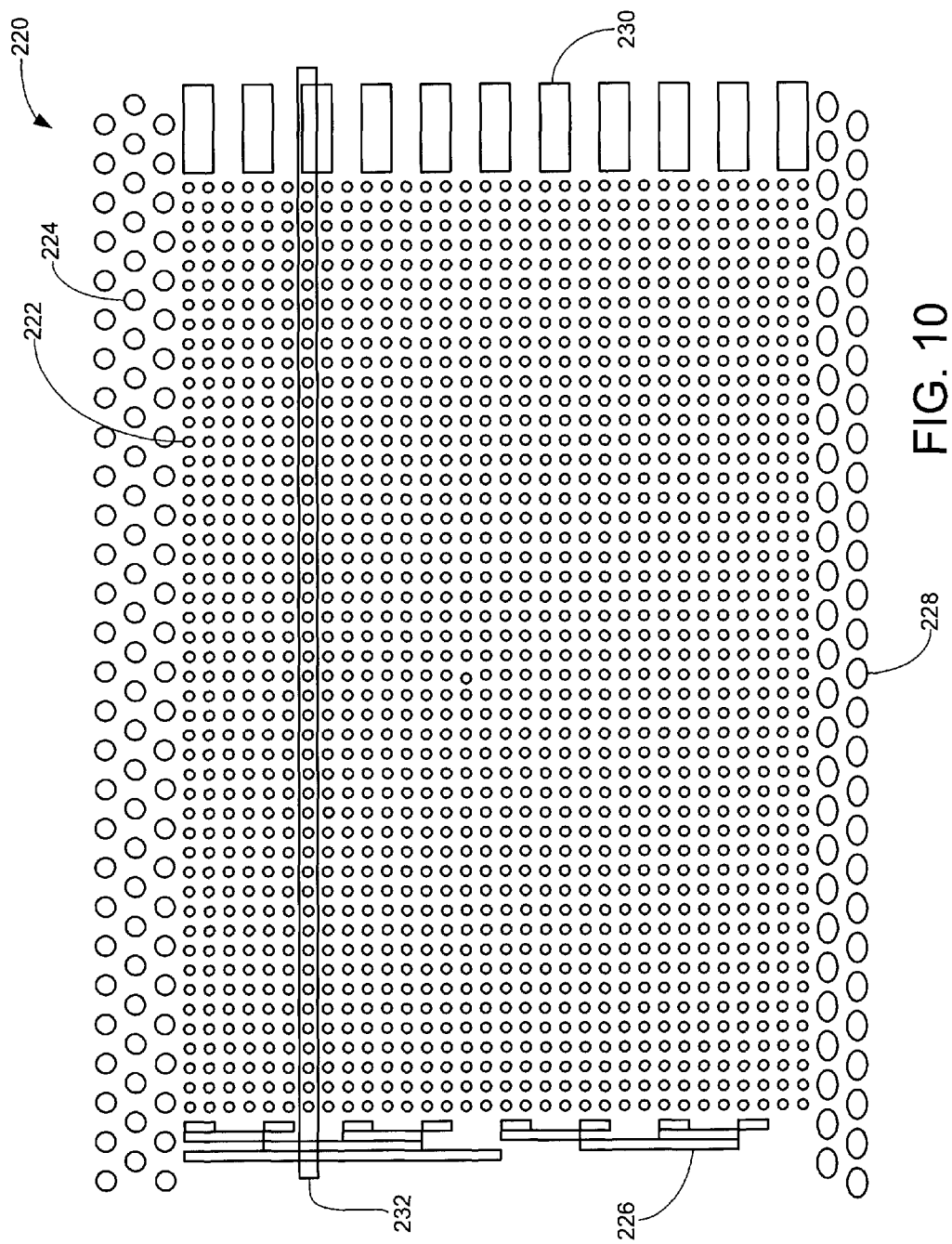
FIG. 10 shows a third exemplary pattern of features in a 2D array.

FIG. 10 provides a layout of features 220 generally similar to that previously discussed in FIG. 8. In FIG. 10, a number of different types of features are provided including small round features 222, large round features 224, rectangular features 226, elliptical features 228 and large rectangular features 230. As before, any number of different types and arrangements of features can be used, so the pattern 220 is merely illustrative and not limiting.

The features can be provided for any number of different functions, such as servo data information, individual bit cells for the storage of individual bits of user data, and so on. Moreover, as before the pattern may be part of a semiconductor layout for a particular solid-state device, such as a memory or controller chip, etc. The pattern 220 shown in FIG. 10 may be a repeatable pattern that repeats a number of times across the medium. To provide a simplified, non-limiting example, it will be contemplated that the substrate is a recording disc and the pattern 220 appears eight times in a circumferential arrangement around the medium.

The pattern 220 in FIG. 8 constitutes 32 radially adjacent addressable data sectors, one of which is denoted by enclosure 212. Each sector generally corresponds to a different row of the small round features 202, and stores 48 bits of user data (small round features 202). The leading rectangular features 206 provide address data for the sectors, and the trailing rectangular features 210 constitute servo dibits for the sectors.

To describe the sector 232, the address bits for the sector (rectangular features 206) could be discretely encoded such as by five (5) bits of address coding (e.g., $2^5$=32). Assume as before that four recording parameters are used for each recorded feature in the sector 232, with eight (8) bits required for each parameter of power, leading edge timing, trailing edge timing and radial position. The 48 data bits (small round features 202) could be described in a discrete manner using the four recording parameters. The servo bits (large rectangular features 210) could be discretely encoded using five (5) bits of servo data. Assuming 32 bits per recording bit, the entire sector 212 could be encoded with 32×(5+48+5)=1856 bits. A next adjacent sector may require address and servo bits to be discretely encoded, but could re-use all of the data associated with the data bits from the sector 232. Therefore, the remaining sectors could be written using only 32×(5+5) =320 additional bits.

A complete track with a total of 8 of the sectors 232 could be encoded using 1856+(7×320)=4096 bits in accordance with this approach, By contrast, the same track recorded discretely might require a total of 14,848 bits. The entire set of 32 tracks shown in FIG. 10 could be represented with (32× (5+48+5))+(55×320)=19,456 bits. This same zone recorded in accordance with prior methods might require (32×(5+48+ 5))×56=103,936 bits.

Thus, repeating areas of sectors recorded on the same track, as exemplified in FIG. 10, can be re-used by the recording signal generator, and do not have to be generated or transmitted to the recording signal generator multiple times. It will be appreciated that this approach is not limited to sectors, but rather to any number of aggregations of repeating groupings of features. Moreover, while this approach is particularly suited to groupings of different types of features (e.g., the sector 232 has differently shaped features 222, 226 and 230), such is not necessarily required.

Figure 11:
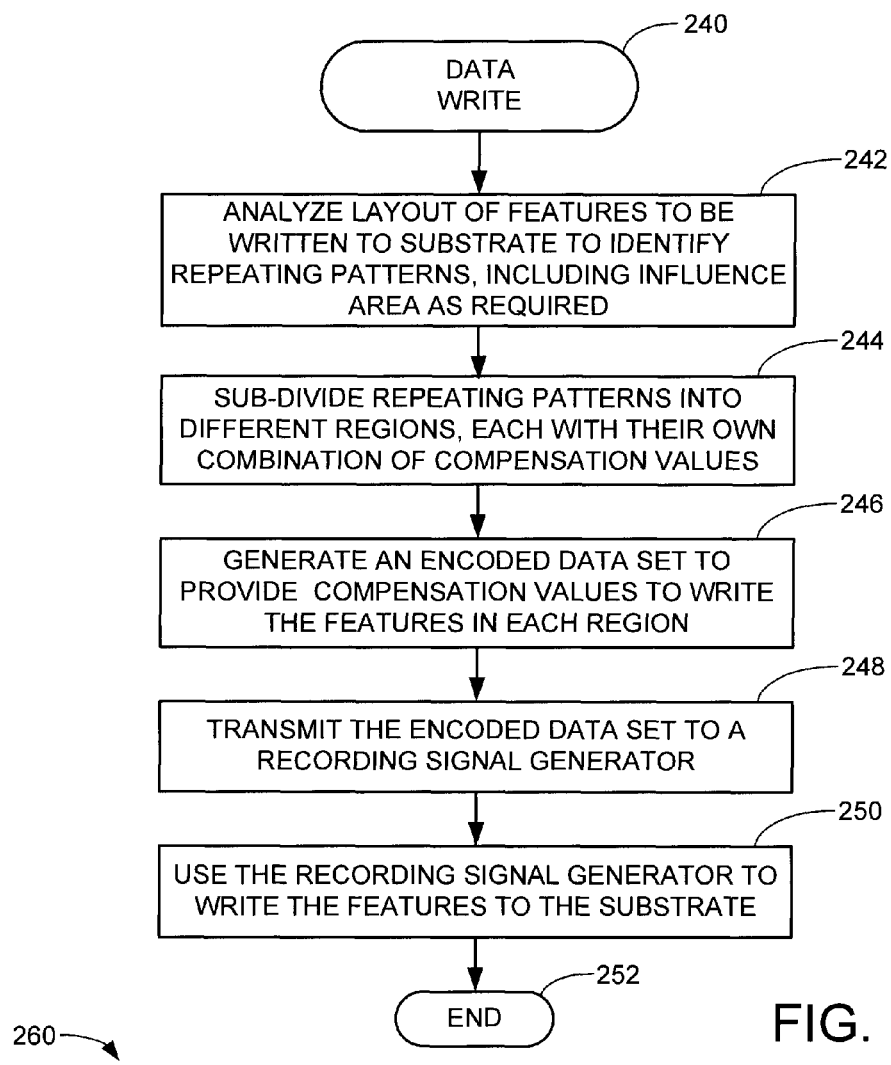
FIG. 11 provides a flow chart for a DATA WRITE routine useful in writing the pattern of features in FIG. 10.

FIG. 11 accordingly provides a DATA WRITE routine 240 to set forth steps that can be carried out in accordance with the foregoing discussion. As before, this routine can be carried out by a write system such as shown in FIG. 5, although other suitable environments can be used.

At step 242, a planned layout of features to be recorded to a substrate is initially analyzed to find repeating patterns of groups of features in the horizontal and/or vertical dimensions. In some embodiments, this may be carried out at the logical level (e.g., at the addressable sector level as in FIG. 10), so that the search is geared for analysis along a single direction (e.g., along each track). The patterns may include groupings of differently sized features, or groupings of repeating regions as in FIG. 8. An influence area may be calculated at this time and used in this determination, although such is not required.

The routine continues at step 244 to sub-divide the repeating patterns into different regions (areas), including repeating regions as with the sector 232 in FIG. 10. As before, some portions of the layout of features may result in an irregular pattern that requires discrete description of compensation values for each feature.

At step 246, the recording feature in each area is described in a discrete manner as before, such as a set of compensation values used for each feature and a repeat count in the horizontal and/or vertical dimensions. This will provide an encoded data set that provides the requisite information to write each identified pattern.

At step 248, the encoded data set is transmitted to a recording signal generator, which in turn writes the desired layout of features to the substrate, step 250. The routine then ends at step 252.

It will be appreciated that these related embodiments can be used to analyze logical patterns in various dimensions in order to locate repeating sequences of features as well as non-repeating features. Repeating features may be described using one set of recording parameters and a count value indicating a total number of features to be written to the associated region using those recording parameters. Thus a logical pattern such as a hard disc drive (HDD) sector can be described by a sequence of discrete descriptions of non-repeating patterns and descriptions of repeating patterns. This hybrid description of the HDD sector using discretely encoded features and descriptive encoded features may be more efficient than a totally discrete encoded logical sector.

Further, the descriptively encoded blocks can be assigned a unique value, and this value can then be used in place of the descriptively encoded blocks to further reduce the amount of data that must be generated and transferred to the recording signal generator. For example, the encoded data can be stored locally for access by the signal generator and then referenced as required. As before, this will tend to reduce the need to transmit data more than once.

Figure 12:
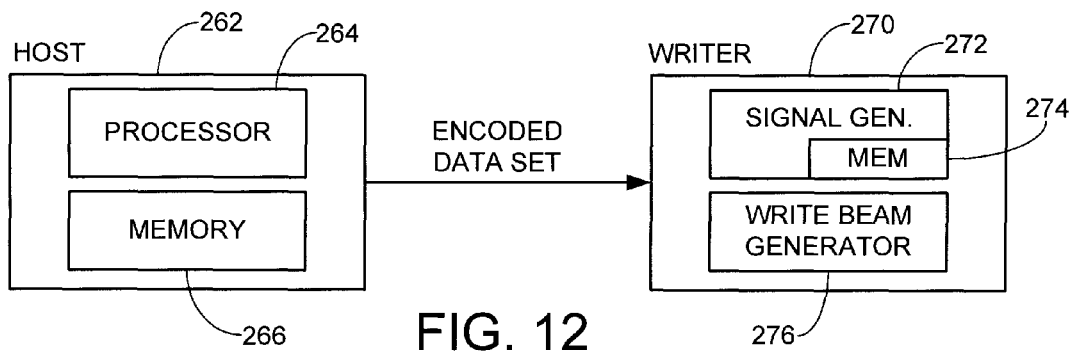
FIG. 12 is a functional block representation of a system suitable for carrying out the respective routines of FIGS. 9 and 11.

FIG. 12 provides a generalized functional block representation of a system 260 that can be adapted to write data to a substrate in accordance with the foregoing embodiments of FIGS. 8-11. The system 260 includes a host device 262, which may take a number of forms such as a computer or other processing device. The host 262 includes one or more programmable or hardware-based processors 264 and associated memory 266.

The host 262 is adapted to be coupled in operative communication with a writer 270, which may take a form similar to that of FIG. 5 and may include a signal generator block 272 with associated memory 274, and a write beam generator 276.

In accordance with at least some embodiments, the host 262 operates via the processor 264 to analyze and form an encoded data set to describe the layout of features for the substrate. This encoded data set may be temporarily stored in the local memory 266. Entry of data by a user, such as through a graphical user interface (GUI, not separately shown), may form a part of the encoded data set generation step. Various compensation values may be calculated or determined empirically.

Once the encoded data set is generated, the same is transmitted to the writer 270 for use by the signal generator block 272 to control the write beam generator 276 during the writing of the associated desired layout to the substrate. Such communication may take place locally, or across a computer network (including but not limited to a wide area network, WAN or the Internet). The received data set may be stored in the signal generator memory 274 and used by the signal generator 272 to generate and output appropriate control signals to the write beam generator 276 to write the desired pattern. While the processing is shown carried out by a separate host device 260, it will be appreciated that this functionality can be incorporated directly into the writer 270.

The various embodiments disclosed herein can provide a number of benefits over prior art data processing approaches. Significantly fewer compensation value calculations and data transfers are generally required, allowing greater levels of production throughput. Unique sets of compensation values can be assigned to different regions and transmitted a single time to a signal generator, which then reuses the compensation values for other regions that utilize the same compensation values. Rotatable storage media such as in FIG. 1 can have a single set of compensation values generated for a single track, a subset of tracks, and/or groups of features (such as sectors) around each track in each zone, and then these compensation values can be used to write all of the tracks in each zone.

Figure 13:
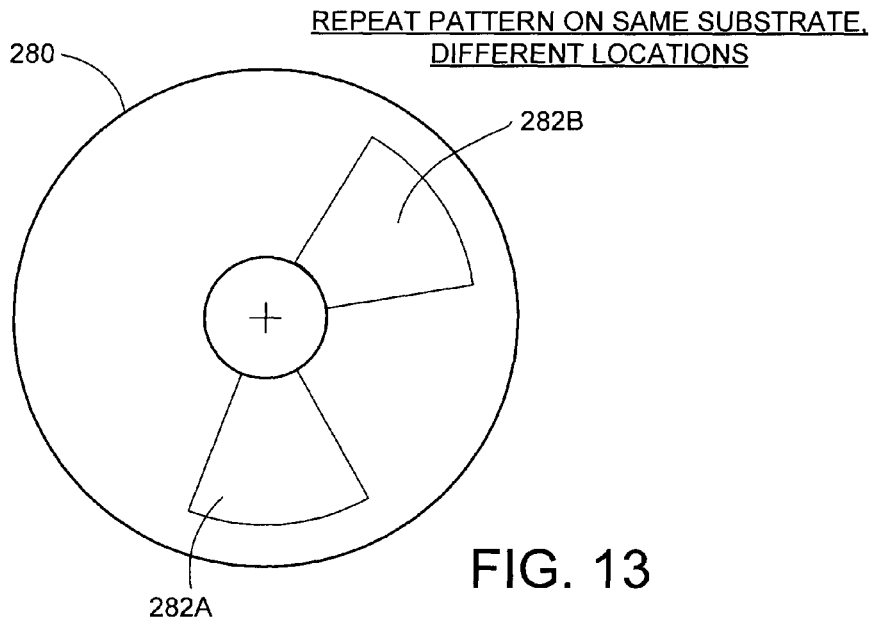
FIG. 13 shows a medium to which features may be written in accordance with various embodiments.

FIG. 13 shows a first example in which data are to be written to a substrate 280. An encoded data set is generated to provide compensation values for the features to be provided to a first location 282A on the substrate 280. This same arrangement of features is repeated one or more times on the substrate, such as indicated by 282B, which is at a different, second location. In accordance with various embodiments, the encoded data set can be transmitted only a single time and reused to write the respective locations 282A, 282B.

Figure 14:
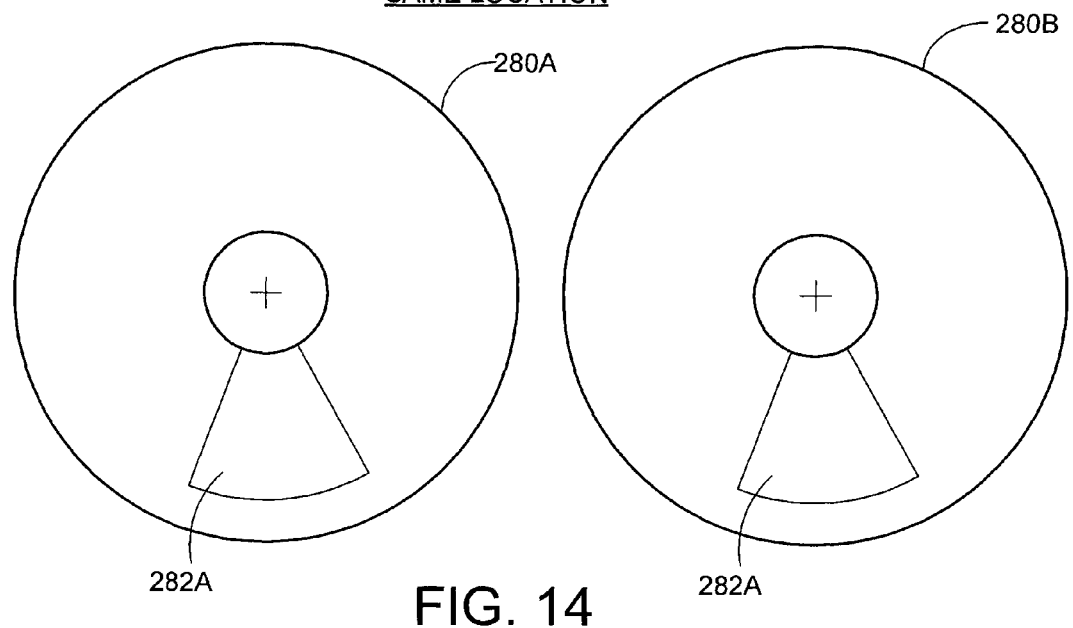
FIG. 14 shows multiple media to which features may be written in accordance with various embodiments.

In another example, FIG. 14 shows two nominally identical substrates 280A, 280B. As before, an encoded data set can be generated to provide compensation values for the features to be provided at the first location 282A on the first substrate 280A. This same encoded data set can be subsequently used to write the features for the second substrate 280B, without the need to retransmit the data.

While presently preferred embodiments are directed to writing a pattern to a rotatable recording medium such as a magnetic or optical disc, such is merely exemplary and not limiting. The various embodiments can be readily adapted for use in other embodiments, including but not limited to solid-state memories, semiconductor fabrication, printing of any number of types of indicia, and other uses.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   dividing a multi-dimensional pattern of discrete features of different sizes to be written to a substrate into a plurality of contiguous regions;
   assigning a unique set of compensation values to each region; and
   using a write beam of a write system to write the features to the substrate responsive to said unique sets of compensation values so that all of the features having a common size in at least one region are written using the same compensation values from the associated unique set.

2. The method of claim 1, further comprising transmitting said unique sets of compensation values assigned to each said region only a single time to a controller coupled to the write beam and storing said single time transmitted sets of compensation values in an associated memory, and using the write beam to write multiple copies of each of the plurality of contiguous regions to the substrate using said single time transmitted sets of compensation values.

3. The method of claim 1, in which the plurality of contiguous regions includes a first region having a first set of features and a second region having a different, second set of features, and in which the using step comprises using a first set of compensation values from the assigning step to write all of the features in said first region and using a different, second set of compensation values from the assigning step to write all of the features in said second region.

4. The method of claim 1, in which each unique set of compensation values of the assigning step comprises a count value indicative of a number of features to be written to the associated region, and at least one recording parameter setting value that is applied to each of said features in the associated region.

5. The method of claim 1, in which the plurality of contiguous regions comprises an addressable sector, wherein a plurality of nominally identical additional sectors are to be written to the medium aligned along a selected dimension of the substrate, and the using step comprises writing the addressable sector and the plurality of nominally identical additional sectors to the medium using a common unique set of the compensation values from the assigning step.

6. The method of claim 1, further comprising:
   identifying a first region bounded by respective second and third regions on opposing sides thereof, the first region having a width corresponding to an influence area of the write beam;
   dividing the first region into at least two sub-regions;
   assigning a unique set of compensation values to each of the at least two sub-regions; and
   using the write beam to write the features to each of the at least two sub-regions using the associated set of compensation values.

7. The method of claim 1, further comprising:
- identifying a second region having a selected set of compensation values corresponding to a first region;
- transmitting a first set of data to a write system to write features to the first region using the selected set of compensation values; and
- using the transmitted first set of data received by the write system to write features to the second region without retransmitting said first set of data to the write system.

8. The method of claim 1, further comprising transmitting an encoded data set to a signal generator of the write system and storing the encoded data set in memory, wherein the signal generator provides control signals to adjust the write beam responsive to the encoded data set to write each of the plurality of contiguous regions in turn, the encoded data set formed responsive to the unique set of compensation values assigned to each region.

9. An apparatus comprising:
- a memory which stores a set of encoded data which provides a unique set of compensation values for each of a plurality of different contiguous regions of a multi-dimensional pattern of discrete features to be written to a substrate; and
- a write beam which writes the features of the multi-dimensional pattern to the substrate responsive to said set of encoded data in the memory, wherein at least identical regions are written to the substrate using the same portion of the encoded data set.

10. The apparatus of claim 9, in which the set of encoded data is loaded to said memory and the loaded data are used a first time by the write beam to write the multi-dimensional pattern a first time to a first location on the medium, and then reused a second time by the write beam to write the multi-dimensional pattern a second time to a second, different location on the medium.

11. The apparatus of claim 9, in which the set of encoded data is loaded to said memory and the loaded data are used a first time by the write beam to write the multi-dimensional pattern a first time to a first location on a first medium, and then reused a second time by the write beam to write the multi-dimensional pattern a second time to the first location on a different, second medium.

12. The apparatus of claim 9, further comprising a processor which generates the set of encoded data as a set of compensation values applied during the writing of said features by the write beam, and transmits said encoded data to the memory a single time for the writing of the substrate by the write beam.

13. The apparatus of claim 9, in which the set of compensation values for a selected region comprises a write power level value which sets a beam intensity amplitude of the write beam for a plurality of features in the selected region.

14. The apparatus of claim 9, in which the set of compensation values for a selected region comprises a duty cycle value which sets a duty cycle of the write beam for a plurality of features in the selected region.

15. The apparatus of claim 9, in which the set of compensation values for a selected region comprises a deflection signal that deflects the write beam in a selected dimension relative to the substrate.

16. The apparatus of claim 9, in which at least a selected one of the contiguous regions comprises an addressable data sector on the substrate.

17. The apparatus of claim 9, in which the substrate comprises an optical disc.

18. The apparatus of claim 9, in which the substrate comprises a magnetic recording disc and the written features comprise servo and data bit locations.

* * * * *